(12) United States Patent
Hwang

(10) Patent No.: US 9,502,696 B2
(45) Date of Patent: Nov. 22, 2016

(54) TERMINAL-COVER ASSEMBLY FOR SECONDARY BATTERY

(71) Applicant: Hong-Wen Hwang, Hsinchu (TW)

(72) Inventor: Hong-Wen Hwang, Hsinchu (TW)

( * ) Notice: Subject to any disclaimer, the term of this patent is extended or adjusted under 35 U.S.C. 154(b) by 372 days.

(21) Appl. No.: 14/230,136

(22) Filed: Mar. 31, 2014

(65) Prior Publication Data

US 2014/0308548 A1   Oct. 16, 2014

(30) Foreign Application Priority Data

Apr. 12, 2013   (TW) .............................. 102206752 U

(51) Int. Cl.
| | |
|---|---|
| *H01M 2/06* | (2006.01) |
| *H01M 2/30* | (2006.01) |
| *H01M 2/04* | (2006.01) |
| *H01M 2/12* | (2006.01) |

(52) U.S. Cl.
CPC ............. *H01M 2/06* (2013.01); *H01M 2/0482* (2013.01); *H01M 2/0491* (2013.01); *H01M 2/30* (2013.01); *H01M 2/12* (2013.01)

(58) Field of Classification Search
CPC .......... H01M 2/06; H01M 2/30; H01M 2/12; H01M 2/0267; H01M 2/0277; H01M 2/0482; H01M 2/0491
See application file for complete search history.

(56) References Cited

U.S. PATENT DOCUMENTS

| | | | |
|---|---|---|---|
| 2009/0123820 A1* | 5/2009 | Han ..................... | H01M 2/204 429/121 |
| 2011/0287290 A1* | 11/2011 | Byun ..................... | H01M 2/30 429/94 |

* cited by examiner

*Primary Examiner* — Basia Ridley
*Assistant Examiner* — Heng Chan
(74) *Attorney, Agent, or Firm* — Rosenberg, Klein & Lee

(57) ABSTRACT

A terminal-cover assembly for a secondary battery comprises a cover and at least two terminal assemblies. The cover is arranged on one side of the battery housing and has several through-holes where two terminal assemblies are installed. Each terminal assembly has an electric-conduction terminal penetrating the through-hole. The electric-conduction terminal has an installation member at one end thereof and at least one fixing element with a female thread. A fastening element with a male thread is inserted through the installation member and engaged with the female thread of the fixing element. The fixing element and fastening element are made of an identical material. Thereby, the fastening element and the fixing element can cooperate with electric-conduction plates to cascade secondary batteries to form a battery assembly, neither damaged by hardness difference nor loosened by different extents of deformations resulting from different thermal expansion coefficients.

11 Claims, 4 Drawing Sheets

TERMINAL-COVER ASSEMBLY FOR SECONDARY BATTERY

This application claims priority for Taiwan patent application no. 102206752 filed at Apr. 12, 2013, the content of which is incorporated by reference in its entirely.

BACKGROUND OF THE INVENTION

Field of the Invention

The present invention relates to a terminal-cover assembly for a battery, particularly to a terminal-cover assembly for a secondary battery, whose electric-conduction terminals have high-hardness fastening elements.

Description of the Related Art

In order to output higher voltage, several secondary batteries are cascaded at the electric-conduction terminals thereof by electric-conduction plates to form a battery assembly.

Refer to FIG. 1 for a conventional secondary battery assembly. In FIG. 1, a fastening element 72 passes through an electric-conduction plate 74 and fastens the electric-conduction plate 74 to an electric-conduction terminal 70. The same process is repeated to electrically connect the electric-conduction terminals 70 of several batteries in series sequentially to form a battery assembly. The fastening elements 72 and the electric-conduction plates 74 will be assembled to and disassembled from the electric-conduction terminals 70 repeatedly during usage. The electric-conduction terminals 70 are normally made of high-conductivity metals, such as copper or aluminum, and the fastening elements 72 are normally made of stainless steel. The hardness of copper or aluminum is lower than the hardness of stainless steel. Thus, the repeated assembly and disassembly of the fastening elements 72 will wear and damage the female threads inside the electric-conduction terminals 70.

The fastening elements 72 and the electric-conduction terminals 70 are made of different materials and thus have different thermal expansion coefficients. The temperature of batteries rises during operation. The rising temperature makes the fastening elements 72 and the electric-conduction terminals 70 deform to different extents, and thus loosens the contact of the fastening elements 72, the electric-conduction plates 74 and the electric-conduction terminals 70. The loosened contact may further cause the impedance to rise and the batteries to overheat.

Accordingly, the present invention proposes a terminal-cover assembly for a secondary battery to overcome the abovementioned problems.

SUMMARY OF THE INVENTION

The primary objective of the present invention is to provide a terminal-cover assembly for a secondary battery, which prevents the threads of the electric-conduction terminals and fastening elements from being damaged by hardness difference, and which also prevents the contact of the electric-conduction terminals, fastening elements and electric-conduction plates from being loosened by different extents of deformations resulting from different thermal expansion coefficients, whereby the present invention exempts the secondary battery assembly from overheat caused by degraded contact and increased impedance.

Another objective of the present invention is to provide a terminal-cover assembly for a secondary battery, which is simple-structured and easy to assemble, and which can be fabricated in low cost and high efficiency.

To achieve the abovementioned objectives, the present invention proposes a terminal-cover assembly for a secondary battery, which is arranged on a housing of a secondary battery, and which comprises a cover and at least two terminal assemblies. The cover is arranged on one side of the housing and has a plurality of through-holes where the two terminal assemblies are installed. Each terminal assembly has an electric-conduction terminal penetrating the through-hole. The electric-conduction terminal has an installation member at one end thereof, which protrudes from the cover. The electric-conduction terminal also has at least one fixing element with a female thread. A fastening element with a male thread is inserted through the installation member and engaged with the female thread of the fixing element.

Below, the embodiments are described in detail in cooperation with the drawings to make easily understood the characteristics and accomplishments of the present invention.

DETAILED DESCRIPTION OF THE INVENTION

Figure 1:
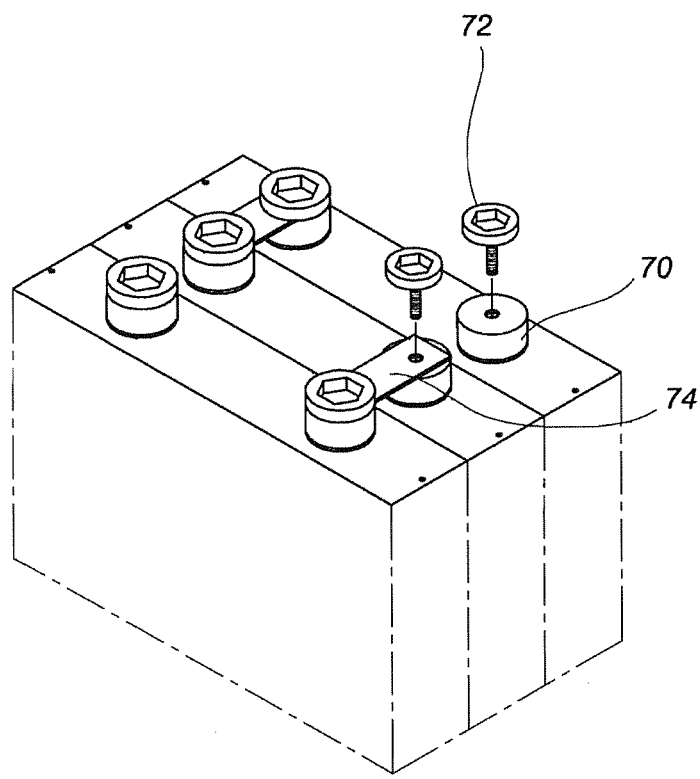
FIG. 1 is a perspective view schematically showing a conventional secondary battery assembly.
Figure 2:
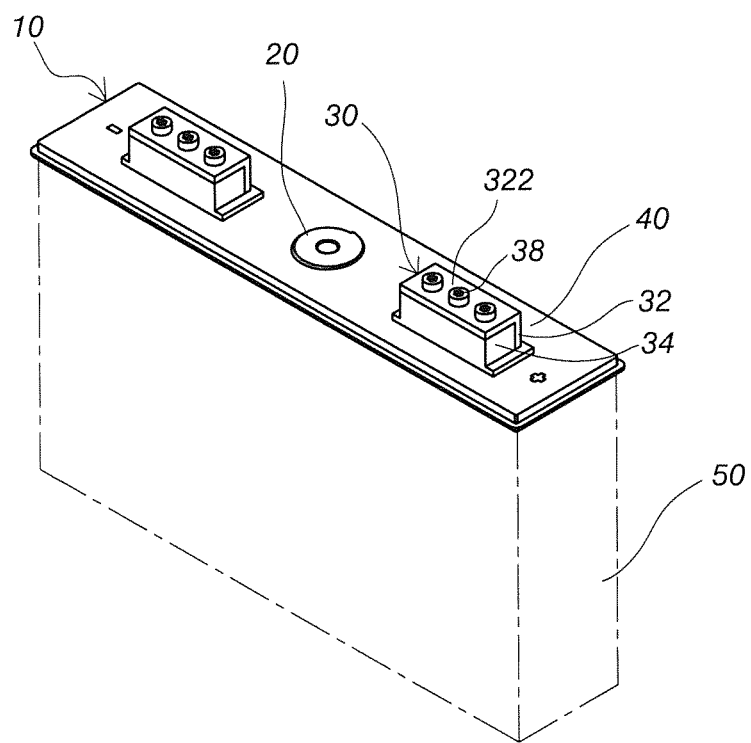
FIG. 2 is a perspective view schematically showing a terminal-cover assembly installed in a secondary battery according to one embodiment of the present invention.
Figure 3:
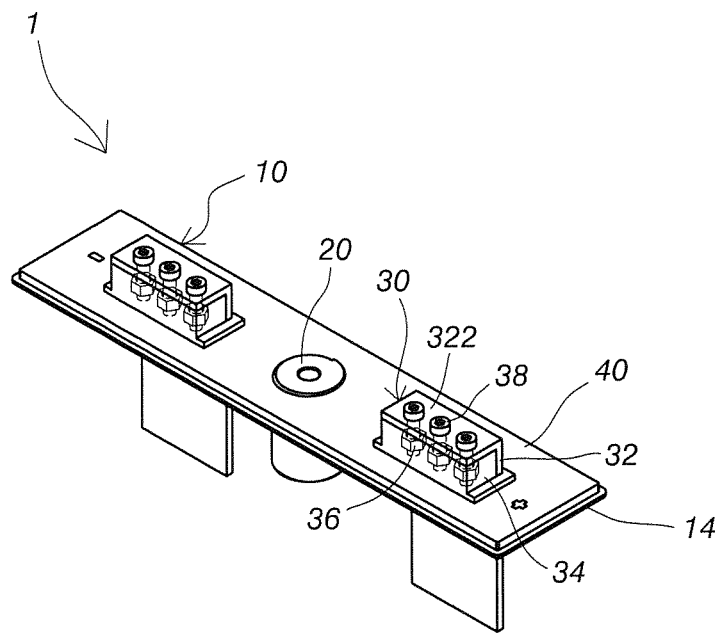
FIG. 3 is a perspective view schematically showing a terminal-cover assembly installed for a secondary battery according to one embodiment of the present invention.
Figure 4:
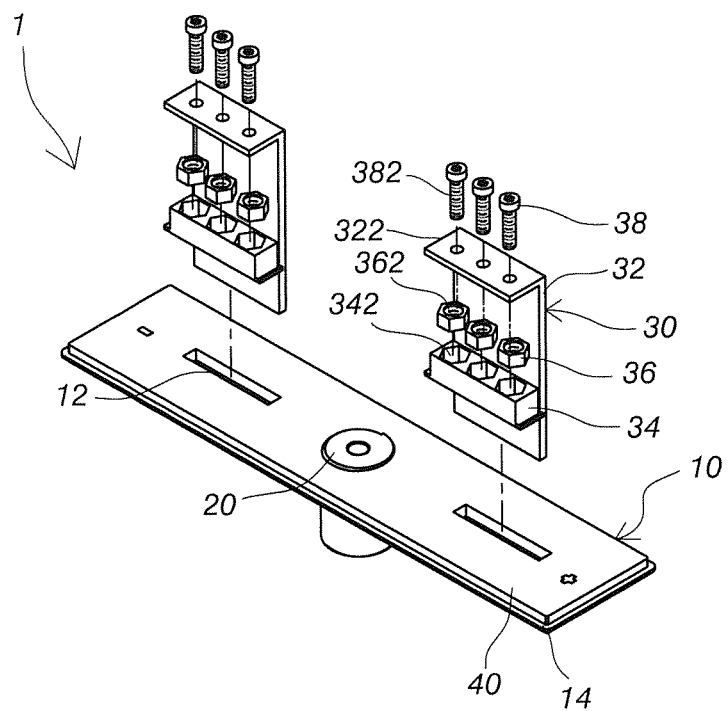
FIG. 4 is an exploded view schematically showing a terminal-cover assembly installed for a secondary battery according to one embodiment of the present invention.

Refer to FIGS. 2-4. The present invention proposes a terminal-cover assembly 1 for a secondary battery, which is arranged on one side of a housing 50 of a secondary battery, and which comprises a cover 10 and at least two terminal assemblies 30. The cover 10 is made of a metallic material and includes a plurality of through-holes 12 where a pressure-relief valve 20 and the two terminal assemblies 30 are respectively installed. Each terminal assembly 30 has an electric-conduction terminal 32 penetrating the through-hole 12 to connect with an electrode (not shown in the drawings). The electrodes of the secondary battery are respectively connected with the electric-conduction terminals 32 functioning as the positive pole and the negative pole. The electric-conduction terminal 32 has an installation member 322 at one end thereof, which protrudes from the cover 10. The installation member 322 of the electric-conduction terminal 32 is formed via bending the electric-conduction terminal 32. The electric-conduction terminal 32 has a fixing seat 34 below the installation member 322. The fixing seat 34 has at least one accommodation recess 342 to accommodate a fixing element 36. The fixing element 36 has a female thread 362. In one embodiment, the fixing element 36 is a nut. Each terminal assembly 30 also has a fastening element 38 with a male thread on the surface thereof. The fastening element 38 is passed through the installation member 322 and engaged the female thread 362 of the fixing element 36.

Both of the fixing element 36 and the fastening element 38 are made of stainless steel or hard metallic materials having an identical hardness. Thereby, the fastening element 38 and the fixing element 35 is engaged with each other, neither damaged by hardness difference nor loosened by different extents of deformations resulting from different thermal expansion coefficients.

As the fixing element 36 is an element independent from the electric-conduction terminal 32, the electric-conduction terminal can be made of a material different from that of the fixing element, such as copper or aluminum, which has a higher conductivity and favors electric conduction. Therefore, the additional fixing element 36 would not degrade the overall performance of electric conduction.

In the terminal-cover assembly 1 of the present invention, both the electric-conduction terminal 32 and the pressure-relief valve 20 are secured to the cover 10 by an insulating film 40. In one embodiment, the insulating film 40 is made of an insulating rubber. The insulating film 40 wraps the cover 10, the electric-conduction terminal 32 and the pressure-relief valve 20, but reveals two ends of the electric-conduction terminal 32 and the pressure-relief valve 20. The insulating film 40 also reveals the edges of the cover 10 to form an installation rim 14. In fabricating the battery, the installation rim 14 of the cover 10 is welded to the housing 50 with a welding technology, such as a laser welding technology.

Figure 5:
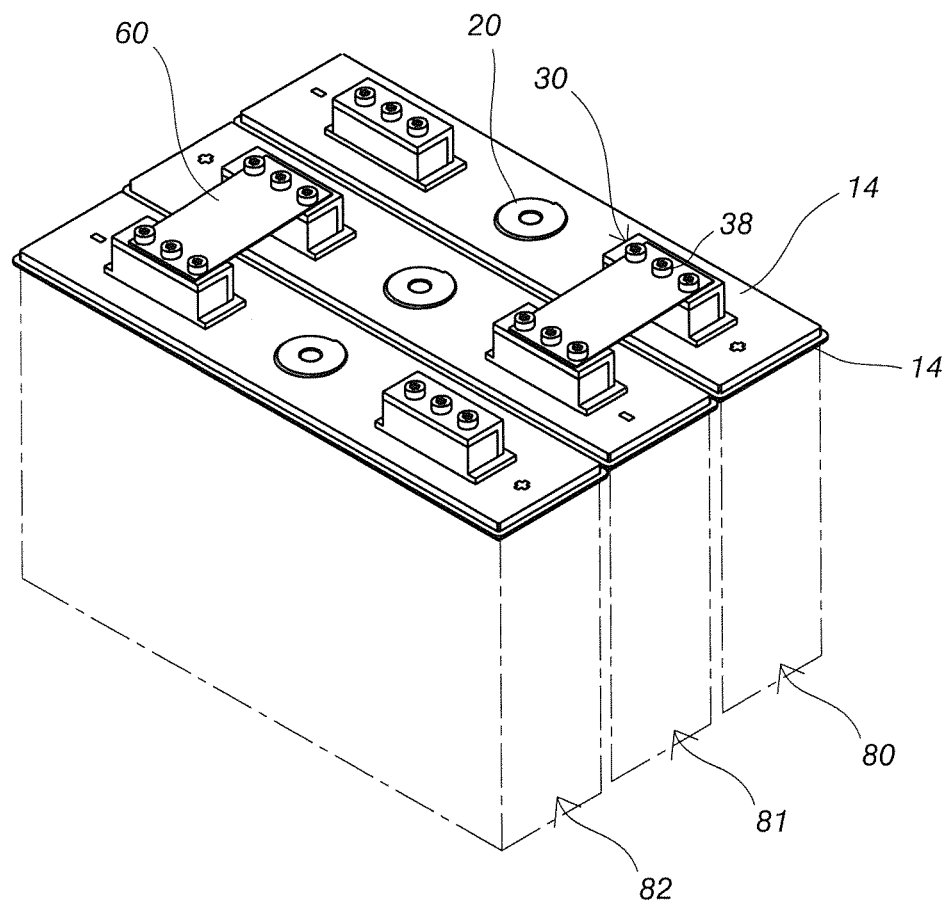
FIG. 5 is a perspective view schematically showing a secondary battery assembly according to one embodiment of the present invention.

Refer to FIG. 4 and FIG. 5 diagrams schematically showing how to use the fixing element 36 and the fastening element 38 to lock an electric-conduction plate 60 to the electric-conduction terminals 32 and cascade several secondary batteries into a battery assembly. In the embodiment shown in FIG. 5, the battery assembly has three secondary batteries, including a first secondary battery 80, a second secondary battery 81 and a third secondary battery 82. The positive pole of the first secondary battery 80 is connected with the negative pole of the second secondary battery 81 by a piece of electric-conduction plate 60. The positive pole of the secondary battery 81 is connected with the negative pole of the third secondary battery 82 by another piece of electric-conduction plate 60. Thereby, the present invention can use a plurality of electric-conduction plates 60 to cascade a plurality of secondary batteries to form a battery assembly outputting higher voltage.

In the present invention, the fixing element 36 and the fastening element 38 are made of an identical metallic material and thus have an identical hardness and an identical thermal expansion coefficient. While the fastening element 38 is engaged with the fixing element 36, the threads thereof would not be damaged by hardness difference. Further, the contact of the fastening element 38 and the fixing element 36 would not be loosened by different extents of deformations resulting from different thermal expansion coefficients. Therefore, the present invention can prevent the battery assembly from overheat caused by degraded contact and increased impedance.

In conclusion, the present invention prevents the threads of the fixing element and the fastening element from being damaged by hardness difference and prevents the contact of the fixing element and the fastening element from being loosened by different extents of deformations resulting from different thermal expansion coefficients. Therefore, the present invention can exempt a battery assembly from overheat caused by degraded contact and increased impedance.

The embodiments described above are only to exemplify the present invention but not to limit the scope of the present invention. Any equivalent modification or variation according to the spirit of the present invention is to be also included within the scope of the present invention.

What is claimed is:

1. A terminal-cover assembly for a secondary battery, which is arranged on one side of a housing of a secondary battery, comprising
   a cover installed on said side of said housing and having a plurality of through-holes;
   at least two terminal assemblies respectively installed in said through-holes and each including
   an electric-conduction terminal that protrudes from said cover and has an installation member, wherein said installation member contains at least one fixing element having a female thread; and
   at least one fastening element having a male thread, passing through said installation member and engaged with said female thread of said fixing element; and
   an insulating film, which wraps said cover and said electric-conduction terminals and secures said electric-conduction terminals to said cover, wherein said insulating film reveals two ends of each said electric-conduction terminal.

2. The terminal-cover assembly for a secondary battery according to claim 1, wherein said fixing element is made of stainless steel.

3. The terminal-cover assembly for a secondary battery according to claim 2, wherein said fastening element is made of stainless steel.

4. The terminal-cover assembly for a secondary battery according to claim 1, wherein said fixing element is a nut.

5. The terminal-cover assembly for a secondary battery according to claim 1, wherein said insulating film reveals edges of said cover to form an installation rim.

6. The terminal-cover assembly for a secondary battery according to claim 1, wherein said insulating film is made of an insulating rubber.

7. The terminal-cover assembly for a secondary battery according to claim 1, wherein said installation member is formed via bending said electric-conduction terminal.

8. The terminal-cover assembly for a secondary battery according to claim 7 further comprising a fixing seat, which is arranged below said installation member and has at least one accommodation recess to accommodate said fixing element.

9. The terminal-cover assembly for a secondary battery according to claim 1, wherein said cover is made of a metallic material.

10. The terminal-cover assembly for a secondary battery according to claim 1, wherein said cover has a pressure-relief valve passing through said through-hole and releasing internal pressure of said secondary battery.

11. A terminal-cover assembly for a secondary battery, which is arranged on one side of a housing of a secondary battery, comprising
    a cover installed on said side of said housing and having a plurality of through-holes; and
    at least two terminal assemblies respectively installed in said through-holes and each including
    an electric-conduction terminal that protrudes from said cover and has an installation member, wherein said installation member is formed via bending said electric-conduction terminal and contains at least one fixing element having a female thread; and at least one fastening element having a male thread, passing through said installation member and engaged with said female thread of said fixing element; and a fixing seat, which is arranged below said installation member and has at least one accommodation recess to accommodate said fixing element.

\* \* \* \* \*